United States Patent [19]

Tiegs

[11] Patent Number: 4,839,316
[45] Date of Patent: Jun. 13, 1989

[54] PROTECTIVE COATING FOR ALUMINA-SILICON CARBIDE WHISKER COMPOSITES

[75] Inventor: Terry N. Tiegs, Lenoir City, Tenn.

[73] Assignee: The United States of America as represented by the United States Department of Energy, Washington, D.C.

[21] Appl. No.: 112,167

[22] Filed: Oct. 26, 1987

[51] Int. Cl.$^4$ .................... C04B 35/56; C04B 35/10; C04B 35/80
[52] U.S. Cl. ........................ 501/89; 501/128; 264/60
[58] Field of Search ..................... 501/89, 128; 264/60

[56] References Cited

U.S. PATENT DOCUMENTS

| | | | |
|---|---|---|---|
| 1,356,211 | 10/1920 | Linbarger | 501/89 |
| 1,546,833 | 7/1925 | Geiger | 501/89 |
| 2,314,758 | 5/1943 | Berns | 501/89 |
| 2,388,080 | 10/1945 | Riddle | 501/89 |
| 2,644,799 | 7/1953 | Robinson | 264/60 |
| 2,943,008 | 6/1960 | Saunders | 264/60 |
| 3,230,100 | 1/1966 | Davies et al. | 501/89 |
| 3,759,725 | 9/1973 | Steen | 501/89 |
| 4,543,345 | 9/1985 | Wei | 501/89 |

*Primary Examiner*—William R. Dixon, Jr.
*Assistant Examiner*—David M. Brunsman
*Attorney, Agent, or Firm*—Earl L. Larcher; Stephen D. Hamel; William R. Moser

[57] ABSTRACT

Ceramic composites formed of an alumina matrix reinforced with silicon carbide whiskers homogenously dispersed therein are provided with a protective coating for preventing fracture strength degradation of the composite by oxidation during exposure to high temperatures in oxygen-containing atmospheres. The coating prevents oxidation of the silicon carbide whiskers within the matrix by sealing off the exterior of the matrix so as to prevent oxygen transport into the interior of the matrix. The coating is formed of mullite or mullite plus silicon oxide and alumina and is formed in place by heating the composite in air to a temperature greater than 1200° C. This coating is less than about 100 microns thick and adequately protects the underlying composite from fracture strength degradation due to oxidation.

6 Claims, 2 Drawing Sheets

PROTECTIVE COATING FOR ALUMINA-SILICON CARBIDE WHISKER COMPOSITES

BACKGROUND OF THE INVENTION

The present invention relates generally to providing alumina-silicon carbide whisker composites with a protective coating which significantly inhibits oxidation degradation of the composite during high temperature applications and more particularly to a method for providing the composite with a coating of mullite ($3Al_2O_3 \cdot 2SiO_2$) or mullite—$SiO_2$—$Al_2O_3$. This invention was made as a result of a contract between Martin Marietta Energy Systems and the U.S. Department of Energy.

The use of ceramic materials in applications subjected to tensile stresses has been very limited due to the inherent low fracture toughness of ceramics. Recent developments in ceramic technology such as provided by the reinforcement of ceramics by incorporating high strength silicon carbide whiskers therein have considerably increased the fracture toughness and strength of the ceramics so as to render them useful in many high temperature applications where tensile stresses are present. For example, the silicon carbide whisker-reinforced ceramics as described in U.S. Pat. No. 4,543,345, issued Sept. 24, 1985, exhibit considerably improved fracture toughness and tensile strength over unreinforced ceramics.

However, while these SiC whisker-reinforced ceramic composites can be made with significantly high strength and toughness, it has been found that these desired properties imparted into the ceramics by the SiC whisker addition can be easily degraded when the ceramics are exposed to relatively high temperatures due to the oxidation of the whiskers. These referred-to temperatures range upwards from about 600° C. to about 1000° C. where the ceramics are expected to be utilized in applications such as heat engines, heat exchangers, turbines, radiant heat tubes, etc. Because of this strength degradation the oxidation problem is of considerable significance to alumina reinforced with silicon carbide whiskers in high temperature applications. It was discovered that linear weight-gain measurements of these reinforced ceramics at elevated temperatures demonstrated that no protective oxide layer is formed on the surface of the ceramics such as would occur in similar exposures with monolithic SiC and silicon nitride ($Si_3N_4$) and that undesirable oxidation is taking place within the composite structure. This oxidation within the composite structure makes it evident that without some form of protection from oxidation the alumina-silicon carbide whisker composites may not have sufficient strength endurance to be satisfactorily utilized in long-term high temperature applications such as mentioned above.

SUMMARY OF THE INVENTION

Accordingly, in view of the strength-degrading oxidation problems associated with the utilization of silicon carbide whisker-reinforced alumina in high temperature applications, it is a primary aim or objective of the invention to provide a protective coating on such composites for significantly inhibiting or obviating oxidation within the alumina-silicon carbide whisker composite during high temperature utilization. Generally the protective coating on the silicon carbide whisker-reinforced alumina composites is provided by the steps which comprise heating of the composite in an oxygen-containing atmosphere to a temperature greater than about 1200° C. and maintaining the composite at this temperature of greater than about 1200° C. for a duration sufficient to form a coating of mullite or mullite plus silicon oxide and alumina on the surface of the composite.

The provision of the protective surface layer of the present invention may be also provided by coating exposed surface portions of the ceramic composite with a layer or film of a slurry of silicon oxide or silicon oxide and alumina prior to heating the composite to the temperature greater than about 1200° C. In this embodiment an inert atmosphere is preferably used since no oxidation of the SiC whiskers is needed to form the coating.

The method of the invention provides the composite with the protective coating in the order of several microns in thickness, but this protective coating, in effect, seals the composite surface and is sufficiently impervious to oxygen to inhibit or considerably decrease oxygen transport or movement into the interior of the composite and thereby significantly slow down the destructive degradation by oxidation of the composite inwardly from the protective surface layer or coating.

Other and further objects of the invention will be obvious upon an understanding of the embodiments and methods about to be described or will be indicated in the appended claims.

The graphs in the accompanying drawings have been chosen for the purpose of illustration and description of the present invention. The embodiments of the composites illustrated are not intended to be exhaustive or to limit the invention to the precise forms disclosed with respect to oxidation rates and temperatures. The graphs are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

Silicon carbide whisker reinforced ceramic composites which can be protected by the present invention are normally formed by mixing silicon carbide whiskers with alumina powder to provide a homogenous dispersion of the whiskers in the alumina powder which forms a matrix. The silicon carbide whiskers may provide about 1 to 60 volume percent of the mixture. These whiskers have a monocrystalline or a single crystal structure and are in a size range of about 0.1 to 3 micrometers in diameter and a length of about 5 to 100 micrometers. The composites are prepared by hot pressing the homogenous mixture at an adequate pressure and temperature to provide a composite with a density of greater than about 99 percent of the theoretical density for the ceramic material. These composites can be made in accordance with the aforementioned U.S. Pat. No. 4,543,345. Also, if desired, the silicon carbide whisker-reinforced alumina ceramic articles can be made into a relatively complex shape of near theoretical density by employing a pressureless sintering step followed by a hot-isostatic pressing step as disclosed in U.S. Pat. No. 4,652,413, which issued Mar. 24, 1987. In as much as the silicon carbide whisker-reinforced alumina composites of the present invention can be formulated and formed into composites in accordance with the teachings in these patents, these patents are incorporated herein by reference.

Figure 1:
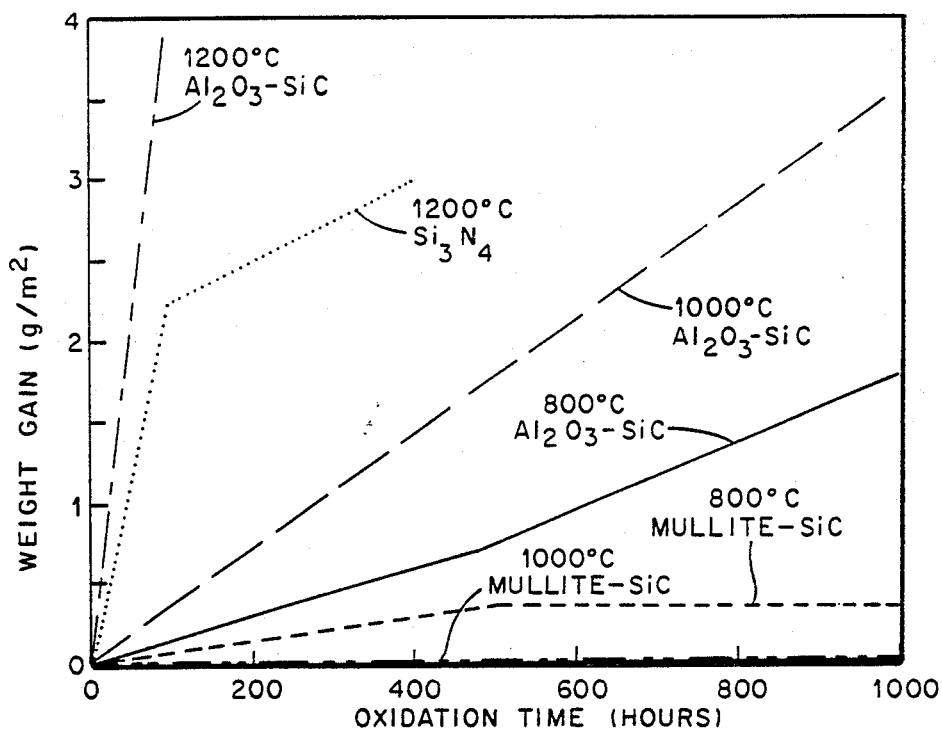
FIG. 1 is a graph illustrating the long-term oxidation of various ceramic composites including silicon carbide whisker-reinforced alumina to which the oxidation inhibiting layer of the present invention is associated.
Figure 2:
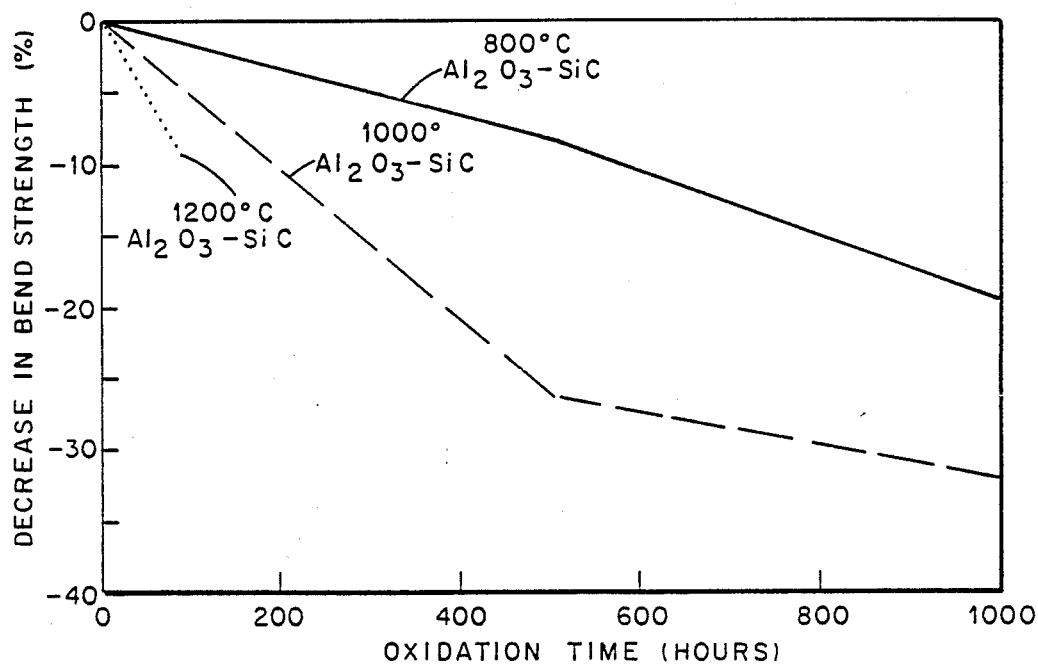
FIG. 2 is a further graph illustrating degradation of ceramic composites as formed on silicon carbide whisker-alumina composites due to the oxidation of the whiskers within the alumina matrix.

The SiC whisker-alumina composites prepared in accordance with the present invention have been found to suffer strength degrading oxidation within the composite when exposed to temperatures up to about 1200° C. As shown in FIGS. 1 and 2, the alumina-silicon carbide whisker composites when exposed to temperatures in a range of 800° to 1200° C. suffer various degrees of oxidation which, as shown in FIG. 2, provide a significant decrease in the fracture strength of the composite so as to significantly weaken the ceramic composites and thereby detract from their usefulness in desired high-temperature applications. FIG. 1 also dramatically illustrates that mullite-silicon carbide whisker composites undergo considerably less oxidation than composites with alumina matrix. The weight gain due to oxidation of the mullite-silicon carbide whisker composites is such a relatively low amount so as to minimally detract from the strength of the composite upon exposure to high temperatures up to about 1000° C. over a long period of time.

Figure 3:
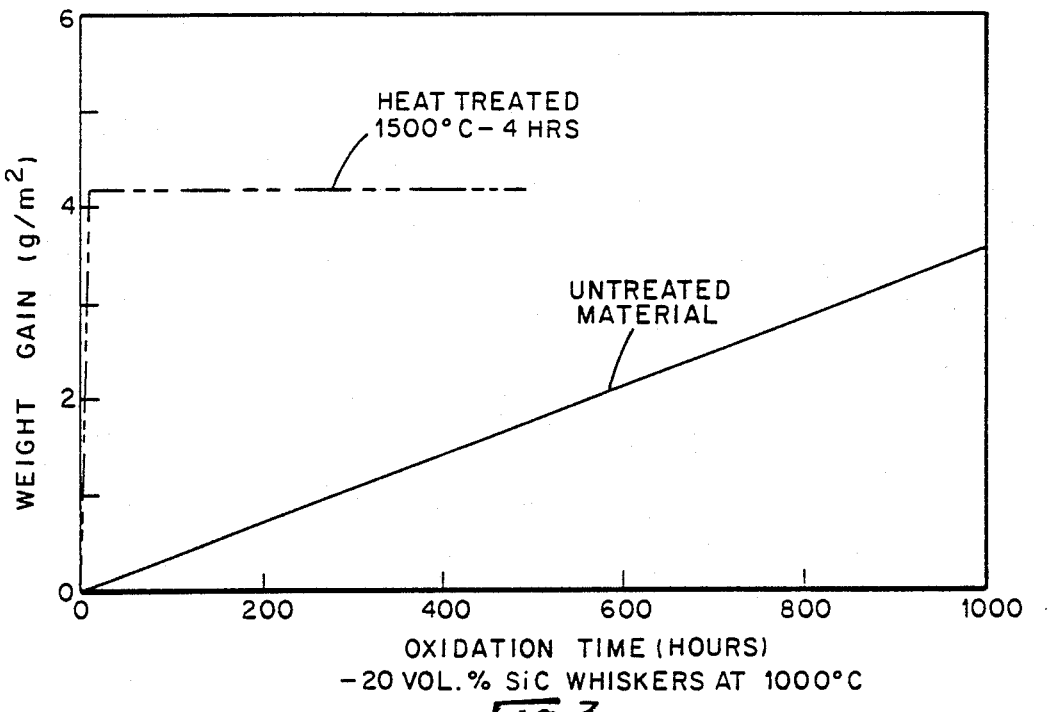
FIG. 3 is a graph illustrating the oxidation of alumina-silicon carbide whisker composites that are treated in accordance with the present invention as compared with untreated samples of the same composite.

The present invention obviates or substantially minimizes this undesirable oxidation of the composite by applying a protective coating on the surface of the composite which significantly decreases the extent of oxidation within the composite when exposed to oxygen-containing atmospheres at high temperatures. As shown in FIG. 3, the preoxidation of the surface layer or the near-surface region of the silicon carbide whisker-alumina reinforced composites containing 20 volume percent whiskers provided a substantial reduction in further oxidation within the composite when exposed to 1000° C. temperature over a duration of several hundred hours. Also as shown in FIG. 3 the weight gain due to oxidation in grams per square meter for the untreated material has nearly a linear increase from a zero value as it is exposed to air over a long duration at 1000° C. Conversely, the heat treated or preoxidized material shows an initial gain in weight due to the formation of the surface coating but little if any weight gain over over an extended time period.

The protective coating may be formed on the silicon carbide whisker-reinforced alumina composites in either of two ways. The first technique is to heat the composite in an oxygen-containing environment, e.g., air, at a temperature at above 1200° C. for a period in the range of about 0.1 to about 4 hours. This heating may be readily practiced by placing the composites in a furnace containing an air or oxygen rich atmosphere and heating the composites to a temperature of about 1500° C. at a rate of about 500° per hour, holding at tempertaure from about 0.1 to about 4 hours, and then turning off the furnace for cooling the composites down. Normally, this heating and cooling operations would take a period of about 4 hours to 8 hours which is adequate to provide the composite with a coating having a thickness in a range of about 20 to 100 microns. It is found that this coating of mullite or mullite plus silicon oxide and alumina is of a sufficient thickness to be essentially impervious to oxygen to significantly slow down oxidation of the SiC whiskers within the composite.

Alternatively, the mullite or mullite plus silicon oxide and alumina coating may be achieved by applying a layer or coating of a slurry of silicon oxide or silicon oxide plus alumina on exposed surfaces of the composite and then heating the composite in an inert atmosphere of argon, helium, or nitrogen for the same time period and temperature range as used in forming the protective coating in the aforementioned first technique to provide for the formation of the protective coating of a sufficient thickness. The slurry containing the silicon oxide or the silicon oxide and alumina may be formed with a suitable carrier such as water or alcohol. The slurry may be applied onto the composite with a thickness of about 100 microns by brushing or spraying or any other suitable manner. During room-temperature conditions or heating of the slurry-coated composite the carrier will readily volatilize so as to leave only the silicon oxide or silicon oxide and alumina on the surface of the composite. During heating, the silicon oxide reacts with the alumina forming the composite matrix or the alumina in the slurry to form the protective coating. Since the silicon oxide is present on the surface of the composite from the slurry, an oxygen-containing atmosphere is not necessary to form the coating as in the case where the SiC whiskers are oxidized to $SiO_2$ to form the coating. However, satisfactory results can be achieved by heat treating the slurry coated composites in an oxidizing atmosphere.

In order to provide a better understanding of the present invention an example relating to a typical fabrication of an alumina-silicon carbide whisker composite provided with a protective coating is set forth below.

EXAMPLE

Figure 4:
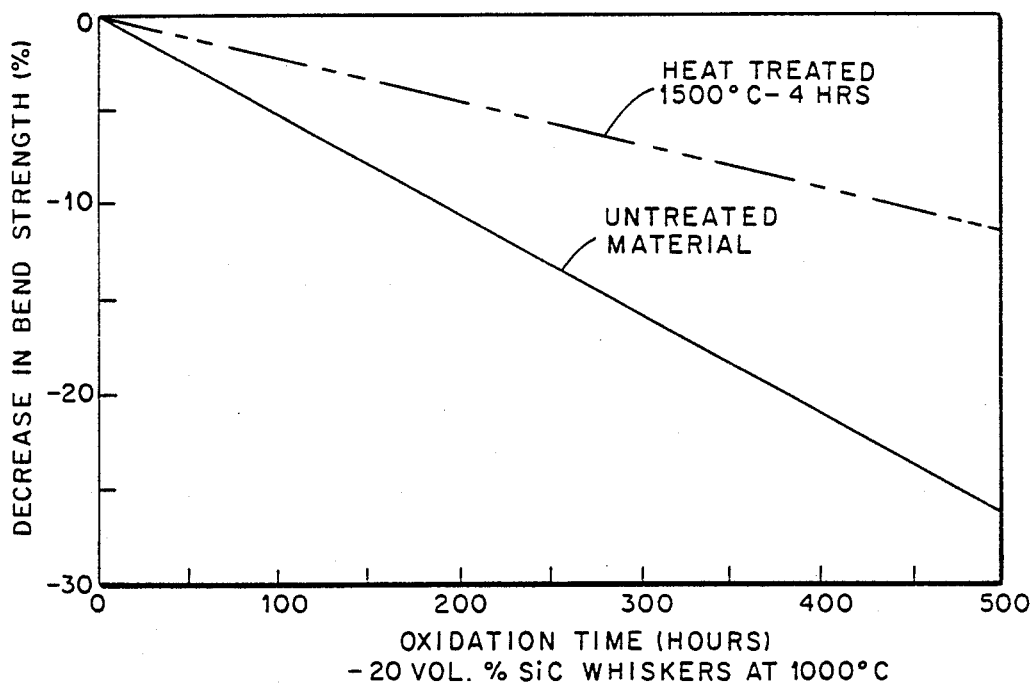
FIG. 4 is a further graph illustrating the extent of strength degradation due to oxidation within the matrix by utilizing the protective coating of the present invention.

A silicon carbide whisker-reinforced alumina composite containing 20 volume percent of silicon carbide whiskers prepared as described in aforementioned U.S. Pat. No. 4,543,345 was heated in a furnace in air to 1500° C. at a rate of 500° C. per hour and then cooled within the furnace to room temperature over a total duration of about four hours. The high temperature promoted the formation of a layer of mullite plus silicon oxide and alumina on the surface of the composite as shown by metallographic examination. An initial weight gain was indicated in the composite due to the formation of the mullite by oxidation and the combination reactions of the surface constituents of the composite. After forming the coating on the composite it was heated in air to 1000° C. As indicated in FIG. 3, there was no further weight gain at 1000° C. for 500 operating hours. The degradation of composite fracture strength was shown to be dramatically less after heat treating the composite in accordance with the present invention and exposure to oxidizing conditions at high temperatures as compared to an untreated composite of similar composition. As shown in FIG. 4, the treated composite suffered a fracture strength degradation of only about 10 percent whereas the untreated composite exhibited greater than a 25 percent reduction in fracture strength.

The mechanism by which the present invention provides the protective coating is that at temperatures greater than about 1200° C., which is the formation temperature for mullite or mullite plus silicon oxide and alumina from the composite constituents, i.e., the silicon oxide from the oxidation of the silicon carbide whiskers and the alumina of the alumina matrix, or from the applied slurry. This reaction at the surface of the composite slightly degrades the SiC whiskers in the near surface region but such degradation is insignificant compared to the protection provided to the entire bulk composite during exposure to oxygen-containing environments at high temperatures. On the other hand, if the composite is first provided with the slurry before the heat treatment, the degradation of the silicon carbide whiskers is insignificant since the mullite or mullite plus silicon oxide and alumina has little effect upon the underlying composite constituents.

It will be seen that the protective coating of the present invention provides a relatively simple mechanism for protecting silicon carbide whisker-reinforced alumina composites when employed in applications where exposures in air to high temperatures (up to about 1000° C.) are encountered so as to minimize fracture strength degradation within the composite which would normally occur without the protective coating.

I claim:

1. A method for forming a protective coating on a ceramic composite consisting essentially of an alumina matrix having about 1 to 60 volume percent silcon carbide whiskers dispersed therein, comprising the steps of heating the composite in an oxidizing atmosphere to a temperature greater than about 1200° C., and maintaining the composite at temperature greater than about 1200° C. for a duration sufficient to form an essentially oxygen impervious coating of mullite or mullite plus silicon oxide and alumina on the surface of said composite for inhibiting oxidation of silicon carbide whiskers in the composite underlying the coating.

2. The method for forming a protective coating on a ceramic composite as claimed in claim 1, wherein the composite is heated to a temperature in the range of about 1200° to 1500° C., and wherein the composite is exposed to temperatures in said range for a duration in the range of about 0.1 to four hours for providing the coating with a thickness in the range of about 20 to 100 microns.

3. The method for forming a protective coating on a ceramic composite as claimed in claim 1, wherein the oxidizing atmosphere is air, and wherein the silicon oxide in the mullite is provided by the oxidation of silicon carbide whiskers in near surface regions of said composite.

4. The method for forming a protective coating on a ceramic composite as claimed in claim 1, including the additional step of coating exposed surface portions of the ceramic composite with a layer formed of a slurry of silicon oxide or silicon oxide and alumina.

5. A method for forming a protective coating on a ceramic composite consisting essentially of an alumina matrix having about 1 to 60 volume percent silicon carbide whiskers dispersed therein, comprising the steps of coating exposed surface portions of the composite with a layer formed of a slurry of silicon oxide or silicon oxide and alumina, heating the slurry coated composite in an inert atmosphere to a temperature greater than 1200° C., and maintaining the composite at temperature greater than about 1200° C., for a duration suffficient to form an essentially oxygen impervious coating of mullite or mullite plus silicon oxide and alumina on the surface of said composite for inhibiting oxidation of silicon carbide whiskers in the composite underlying the coating.

6. A ceramic composite consisting essentially of an alumina matrix having dispersed therein about 1 to 60 volume percent silicon carbide whiskers, said composite having a substantially oxygen-impervious coating on exposed surfaces thereof of a thickness in the range of about 20 to 100 microns, said coating consisting essentially of mullite or mullite plus silicon oxide and alumina for inhibiting oxidation of silicon carbide whiskers in the composite underlying the coating.

* * * * *